Patented July 20, 1954

2,684,350

UNITED STATES PATENT OFFICE 2,684,350

COMPOSITION OF MATTER COMPRISING POLYVINYL ACETAL RESIN, BUTADIENE RUBBER, AND PHENOL-ALDEHYDE RESIN

George M. Williams, New Haven, Ind., assignor to United States Rubber Company, New York, N. Y., a corporation of New Jersey No Drawing. Application September 9, 1952, Serial No. 308,714

9 Claims. (Cl. 260—43)

This invention relates to a new composition of matter and more particularly to a composition of matter especially adapted to use as an adhesive or binder. Still more particularly it concerns novel blends of polyvinyl acetal resins, rubbery butadiene polymers, and phenol-aldehyde resins.

It has been proposed (see Meakin, "Research," volume 5, pages 126–132 (March 1952)) to join surfaces, particularly parts of metals such as are used in the manufacture of aircraft, by painting the adherents with a liquid phenolic resin, then dusting the painted parts with powdered polyvinyl formal resin, then bringing the two parts into contact with one another and applying heat to effect solution of the powdered polyvinyl formal resin in the liquid phenolic resin and convert the phenolic resin to thermoset condition. However, this mode of adhesion is undesirable because of its complexity and because of the variability in the results due to the inability to accurately control the ratio of the two resins. The number of steps in the adhering operation is excessive. The step of dusting the powdered polyvinyl formal resin onto the previously liquid-coated parts is difficult particularly in the case of "undersurfaces," i. e., surfaces which are so disposed that it is not possible to apply the powdered resin thereto by the action of gravity. Another disadvantage is that the resulting bond is unduly brittle with the result that failure occurs upon impact or vibration. With the method described Izod impact strengths of the order of one foot pound per inch of notch have been considered good, but such impact strengths are extremly poor compared to those attainable with my invention.

This invention is based upon my discovery that by providing a mixture of a polyvinyl acetal resin, a butadiene rubber, and a phenol-aldehyde resin and fusing such a mixture by heating there is obtained a material having remarkable adhesive and bonding properties and also useful for coatings. The resulting material exhibits a far greater impact strength, the increase often being of the order of twenty-fivefold, than similar mixtures from which the rubber component is omitted. This great increase in impact strength is obtained without material sacrifice of other mechanical properties. Likewise the material of my invention has remarkable adhesive and bonding properties whereas a comparative mixture from which the phenolic resin is omitted has such poor adhesive properties that it is almost valueless for bonding structural adherents and when such a comparative mixture is used for coating the adhesion is not as high as is desired. Thus it will be seen that the several components of my new mixture cooperate with one another in a new and unobvious manner, the rubbery component contributing remarkable freedom from brittleness and the phenolic resin component contributing unusual adhesive qualities, the whole exhibiting the desired physical or mechanical properties.

The polyvinyl acetal resins employed in my invention are well-known materials, typically derived by conventional methods from polyvinyl acetate by hydrolysis thereof, followed by reaction with an aldehyde. The final polyvinyl acetal resin is generally characterized by the viscosity of the polyvinyl acetate used as the starting material and the degree of acetate replacement by aldehyde. It has been found that the high impact strength phenomenon of the present invention is obtained to best advantage with those polyvinyl acetal resins in which the acetate replacement is relatively high, preferably well above 75% (in terms of the nominal degree of replacement in accordance with the practice in the trade). The polyvinyl acetal resin used preferably is obtained from a polyvinyl acetate of a viscosity of at least 7 centipoises (measured at 20° C. in a benzene solution containing 86 grams of the polyvinyl acetate per liter). The polyvinyl acetal resins are usually made from the lower alkanols, such as formaldehyde, acetaldehyde and butyraldehyde. Polyvinyl formal and polyvinyl butyral constitute the commonest commercially available polyvinyl acetal resins. Of these materials, polyvinyl formal represents the preferred polyvinyl acetal resin for use in the invention. The polyvinyl acetals are normally thermoplastic resins; they are much used in coating and laminating, and they can also be molded into shaped articles. The impact strength of the polyvinyl acetals can be improved only slightly by the addition of those materials typified by dioctyl phthalate and normally considered to be plasticizers, but this expedient results in a serious loss of rigidity and hardness. The present invention affords a means for increasing the impact strength and adhesiveness of the polyvinyl acetals to an astonishing extent without material sacrifice of such mechanical properties as rigidity and hardness. A great sacrifice of such properties generally accompanies an increase in impact strength.

The rubbery butadiene polymers employed in the invention are also well-known materials, and include not only rubbery polybutadiene itself, but also the rubbery polymers, or elastomers, obtained by interpolymerization of butadiene with other copolymerizable monoolefinic materials, such as styrene, acrylonitrile, alkyl acrylate, alkyl methacrylate, vinyl pyridine, vinylidene chloride, dialkyl fumarate, and similar monomers. Generally such elastomers contain at least about 25% of combined butadiene. The rubbery copolymers of butadiene are commonly prepared by emulsion polymerization, as is well-known in the art. The most common commercially available synthetic rubbers are GR-S (butadiene-styrene copolymer) and those rubbers which are collectively known as the Buna N type, which are butadiene-acrylonitrile rubbery copolymers, this group including "Perbunan," "Paracril" and "Hycar OR." The rubbery copolymers of butadiene and acrylonitrile or the acrylates or methacrylates are preferred for use in my invention.

Blends of the aforementioned polyvinyl acetal resin and rubbery butadiene polymer have excellent impact strength but are relatively deficient in adhesive properties. For this reason such blends cannot satisfactorily be employed for joining adherents. For example, they cannot successfully be used to bond together metal parts of airplanes. Nor can they successfully be used for joining wood parts together. In general, they cannot satisfactorily be used for joining any structural parts together because of their deficient adhesive properties. Likewise they do not lend themselves well to use as coating compositions because of their inadequate adhesion to the surface to be coated. Although the coating appears upon first glance to be tenaciously adhered to the base, nevertheless it is rapidly separated therefrom by exposure to liquid water and then shows no evidence of having been truly adhered to the base.

The inadequate adhesive properties of the polyvinyl acetal resin-butadiene rubber blends are overcome, without material impairment of other physical properties, by the use of the phenolic resin component in accordance with my invention. The phenolic resin component can be a novolac type of phenolaldehyde resin, used with or without a methylene-yielding hardening agent, e. g., hexamethylenetetramine, in amount sufficient to advance the same to insoluble, infusible form, or it can be of the thermosetting type of either the so-called "A" stage or "B" stage, which is capable upon simple application of heat of advancing to the insoluble, infusible "C" stage. The phenolic resin apparently acts as a wetting agent, bringing about great adhesiveness. It appears to effect true wetting of the surface coated therewith and thereby promote true adhesion thereto. It also serves, prior to final heating or curing, as a vehicle for the polyvinyl acetal resin and the rubber. In the final application, i. e., after fusing and cooling, the phenolic resin contributes to the properties of the whole.

The choice of the phenolic resin will depend largely upon the properties desired in the end product. For example, where a stiff gelled product is desired or where temperatures sufficiently elevated to effect cure of a curing-type phenolic resin cannot be tolerated, as would be the case where it is desired to use my composition as an adhesive to secure a thermoplastic material to wood or metal, it is preferable to use a non-curing novolac type of phenolic resin without a hardening agent therefor. Increased strength and improved physical properties, however, are obtained by the use of a curing-type phenolic resin, e. g., either a thermosetting "A" stage or "B" stage phenolic, or a novolac type phenolic in conjunction with a methylene-yielding hardening agent therefor. Accordingly, use of curing-type phenol-aldehyde resins is generally preferred.

The phenol-aldehyde resin can be either a liquid or a solid or a mixture of a liquid and a solid. Whether a liquid or a solid or a mixture of both is used will depend upon many considerations including the temporary form of the composition, the mode of application, and its end use. The composition can be prepared in many different physical forms, including a solid mixture which preferably is in the form of a sheet or tape, a paste, a troweling putty, a solvent-based cement or coating composition, or a fluid composition which derives its fluidity from a liquid phenolic resin, rather than from an organic solvent, and makes a phenolic resin-based cement-like material suitable for use as a coating composition, binder, or adhesive. An example of the latter type of formulation is a material obtained by blending the polyvinyl acetal resin, the butadiene rubber and an amount of a liquid phenolic resin in the higher portion of the ranges given below.

The relative proportions of the polyvinyl acetal resin, the butadiene rubber and the phenol-aldehyde resin used in the formulation of compositions in accordance with my invention can vary widely depending upon many factors. Generally, however, I employ the polyvinyl acetal resin and the butadiene rubber in relative proportions by weight of from 95 to 70% of the polyvinyl acetal resin and correspondingly from 5 to 30% of the butadiene rubber, and the phenolic resin in a proportion ranging from 3 to 200% by weight based on the sum of the weights of the polyvinyl acetal resin and the butadiene rubber. I prefer to use from 95 to 85% of the polyvinyl acetal resin and correspondingly from 5 to 15% of the butadiene rubber and to employ from 10 to 100% of the phenolic resin based on the sum of the polyvinyl acetal and the rubber. It will be understood that if a plurality of phenolic resins are employed, the sum thereof will come within the indicated ranges.

These three components are mixed together in any suitable manner which avoids fusion of the phenolic resin with the polyvinyl acetal resin-rubber. The temperature should be kept at not over 200° F. during and subsequent to incorporation of the phenolic resin or resins. It is not possible to prepare the composition of my invention by simply fusing the polyvinyl acetal resin, the butadiene rubber and the phenolic resin together for the reason that the fusion temperature of these three diverse ingredients is within the temperature range at which the phenolic resin is advanced to the insoluble, infusible stage. Accordingly, it is necessary to adopt some means other than simply fusing these three ingredients together at an elevated temperature. The composition can be prepared by simple mixing at relatively low temperature but unless a liquid phenolic resin is used the resulting mixture would be a powder difficult to apply. Accordingly, to avoid these difficulties, I use techniques which impart a desirable physical form to my composition. Typically, I accomplish mixing by the use of a mutual solvent, i. e., a volatile organic solvent which will dissolve all three ingredients, such as a blend of toluene, ethyl alcohol and 1,4-dioxane. Alternatively, I can employ a liquid phenolic resin and thereby obtain a solvent-free mixture which can be prepared either in paste or solid form, the solid form being advantageous in many cases because it can be sheeted out and used as a sheet adhesive or as a tape. Still further, I can employ both a mutual volatile organic solvent and a liquid phenolic resin for pastes, cements, or the like.

After the material of my invention has been interposed between the adherents to be joined or applied to the base to be coated or otherwise disposed in the position which it is finally to assume, it is heated to effect fusion of the solid components thereof and limited coalescence or miscibility of the polyvinyl acetal resin and butadiene rubber, on the one hand, with the phenolic resin component or components, on the other hand. It is not believed that complete coalescence or miscibility of all of the components into a single phase necessarily takes place during this heating step for the reason that the end product is quite often opaque whereas the polyvinyl acetal resin and the rubber by themselves or the phenolic resin alone would give a transparent product if heated under the same conditions. If the phenolic resin is of the curing type, this heating step also serves to advance it to the insoluble, infusible stage.

The temperature in the heating step should be sufficient to cause the aforementioned fusion of the components and limited miscibility of the polyvinyl acetal resin and the rubber with the phenolic resin and in the case of the curing-type phenolic resins sufficient to advance the same to the "C" stage. Generally speaking, temperatures ranging from 250° F. to 400° F. will be used in this step. As will be obvious to those skilled in the art, the duration of the heating step will depend upon the temperature used, the type of phenolic resin employed, and many other factors. The selection of a suitable heating or curing time is well within the skill of the art.

The composition of my invention is adapted to many uses. Perhaps the most important use is as an adhesive, especially for joining metal to metal, wood to metal, plastic to metal, etc. A particularly important application is its use for joining metal parts used in the manufacture of aircraft, it being especially suitable for the joining of the alloys of aluminum and magnesium together. It is also very useful for joining solid masses of polyvinyl acetal resin-butadiene rubber blends to other materials such as metal or wood. My composition can also be used for many other purposes such as for protective coatings, as a binder for particulate materials such as abrasive grits (e. g., in the manufacture of abrasive wheels, abrasive papers and abrasive cloths), molder's sand, mica, fibrous materials such as paper and cloth, glass, for coatings utilizing the inherent dielectric property of the material such as insulating coatings for electrical conductors.

The following examples illustrate my invention in more detail. All parts and percentages expressed herein are by weight.

*Example 1*

The following ingredients were commingled:

| | |
|---|---|
| "Hycar OR–15" latex (40% rubber. | 25 parts (10 parts rubber) |
| "Formvar 7/90" (polyvinyl formal derived from polyvinyl acetate having viscosity of 7 centipoises (for a benzene solution containing 86 grams per liter); 90% replacement with formaldehyde) | 90 parts |
| 1,4-dioxane | 90 parts |
| Toluene | 70 parts |
| Ethyl alcohol (commercial) | 30 parts |
| Water | 30 parts |

The water was added to act as a retarder against reaction between the rubber and the phenolic resin during shelf life but later work showed that this was not necessary.

After thorough intermixture of the foregoing ingredients there was added to the mixture with stirring 50 parts of "Durez 7031A" which is a commercial solid thermosetting phenol-formaldehyde resin widely used for securing brake linings to metal brake shoes.

The mixture was allowed to stand for two days whereupon there was added a mixture of 180 parts of 1,4-dioxane, 140 parts of toluene and 60 parts of ethyl alcohol. The resulting mixture was placed in a closed container and "rolled" for two days to promote intimate blending. Then the container was allowed to stand for several days. Upon opening the container it was found that the water had separated and formed an upper layer. This upper layer of water was drawn off, leaving the organic "cement." This adhesive was used in the following three experiments denoted A, B and C.

A. Two pieces of aluminum which had not been cleaned or even degreased were coated with the adhesive and given a flash dry in an oven at about 180° F. to remove the solvent. The two pieces were then placed with their coated sides together and with a 1 square inch area of overlap upon an electric hot plate with a small weight on top. The hot plate was then heated to about 350° F. and then allowed to cool. It is estimated that the adhesive was at a temperature in the bracket of 250–350° F. for about an hour. The ends of the resulting assembly were then placed in the jaws of a Scott tester. The specimen had a very sharp break at some indeterminate point above 800 lbs., this being the limit recordable on the particular testing machine used. Hence the force required to separate the joint was above 800 lbs. per square inch. The adhesive did not separate from either piece of aluminum but broke in cohesion rather than adhesion.

B. A railroad tie spike was rough-sanded to remove loose oxide and scale. The adhesive described above was then applied along about ⅔ of one side of the spike. The spike was then laid with the coated area upon a piece of creosoted oak and a Bunsen flame was played upon the exposed head of the spike to raise the temperature to somewhere in the neighborhood of 350–400° F. Upon removal of the flame it was found that the spike was very tenaciously held to the wood and it required several hard hammer blows on the projecting end to break it away from the wood.

C. A piece of steel key stock, used in simulation of a railroad spike, having a cross section ¼" square was heated to oxidize its surface. A circular hole was then bored in a wooden block, the diameter of the hole being just large enough to receive the piece of steel. This hole was then filled with the above-described adhesive and the steel piece at a temperature of about 400° F. was then inserted into the hole and allowed to cool. The heat of the steel caused curing of the adhesive. Using a Dillon hand-operated testing machine, the force required for straight-line withdrawal of the steel piece from the wooden block was then measured. This force was equiv-

Example 2

| | Parts |
|---|---|
| "Formvar 7/90" | 13.5 |
| Butadiene-methyl acrylate rubbery copolymer | 1.5 |
| "Monsanto Phenolic Resin 482" (a thermosetting liquid phenol-formaldehyde resin) | 10 |
| 1,4-dioxane | 75 |

These ingredients were thoroughly commingled to form a uniform intimate mixture. The resulting adhesive was tested for its ability to adhere an iron railroad spike to creosoted wood, the wood being first coated with the adhesive and the hot railroad spike then being laid thereupon to effect curing of the adhesive. The spike was very tenaciously adhered to the wood.

Example 3

| | Parts |
|---|---|
| "Formvar 7/90" | 90 |
| Butadiene - acrylonitrile rubbery copolymer (recovered from "Hycar OR–15" latex) | 10 |

These two ingredients were intimately blended on a rubber mill. Thirty parts of the resulting mixture were then admixed with 50 parts of ethyl alcohol and 125 parts of toluene in a blade mixer. There was then added 30 parts of "Monsanto 482" phenol-formaldehyde resin such as was used in Example 2. The mixture was stirred to uniform condition and then allowed to stand 24 hours. It was a very excellent adhesive.

Example 4

| | Parts |
|---|---|
| "Durez 7031A" | 10 |
| "Formvar 7/90" | 10 |
| "Hycar OR–15" rubber (cold-milled) | 1 |
| 1,4-dioxane | 200 |

The phenolic resin, the polyvinyl formal resin and the cold-milled rubber were intimately mixed with the solvent in conventional manner and the resulting mixture was "rolled" for 4 hours. This adhesive was then used in the following three experiments.

A. One hundred parts of molder's sand was intimately mixed with 10 parts of the above composition. A portion of this mixture was placed upon a piece of flat grain yellow pine and the assembly was placed in a 295° F. oven for 20 minutes. Upon removal, it was found that the composition was not brittle and would not break even when pounded severely with a hammer. To remove it from the wood necessitated breaking the grain of the wood.

B. The above-described cement was coated on a railroad tie and on a railroad spike. The two were placed together and a blowtorch was applied to the end of the spike to heat it and effect curing of the adhesive. It was impossible to pull the spike from the wood with the hands.

C. Two pieces of ¼" O. D. (0.038" wall thickness) aluminum tubing and a block of aluminum 1" thick and having a hole 0.025" larger than the tubing bored therethrough were taken. Approximately ½" of the ends of each of the two pieces of tubing were coated with the above described adhesive and the coated ends were then inserted into the hole in the block with the ends meeting in the middle. The assembly was then heated over a Bunsen flame to at least 400° F. The projecting ends of the tubing were then bent to form handles for torsion tests in the hands. After repeated twistings following long immersion in hot water, the pieces of tubing began to fail in the metal but not in the adhesive.

Example 5

| | Parts |
|---|---|
| "Formvar 7/90" | 11.25 |
| "Hycar OR–15" | 1.25 |
| 1,4-dioxane | 37.5 |

The foregoing ingredients were commingled to form a "cement" whereupon 50 parts of "Monsanto 482" phenolic resin were admixed therewith. Such an amount of the resulting mixture as to furnish 38.5 parts of solids, neglecting the dioxane but considering the "Monsanto 482" resin as being 100 percent solids, was admixed with 279.3 parts of abrasive aluminum oxide grits to form an intimate uniform mixture. A grinding wheel was cast from the resulting mixture and cured by heating in an oven at 300–400° F. for a sufficient time to advance the phenolic resin to the "C" stage. The resulting grinding wheel was successfully used for grinding metal.

From the foregoing description many advantages of my invention will be apparent to those skilled in the art. The principal advantage is that the invention provides an adhesive of extremely high impact strength coupled with remarkable adhesive ability, apparently because of the wettability for the surfaces of the adherents imparted by the phenolic resin component or components. At the same time the adhesive of my invention has other mechanical properties desired in an adhesive. My adhesive can be prepared in any convenient form and it gives far more consistent results than would be obtained with a two-part adhesive composed of a liquid and a powder, such as is described above, because of the ease with which the proportions used in my adhesive are accurately controlled. My composition is also highly useful as a binder generally. Numerous other advantages will appear to those skilled in the art.

Having thus described my invention, what I claim and desire to protect by Letters Patent is:

1. A composition of matter adapted to be used as an adhesive, binder, coating and the like, the binding components of said composition consisting essentially of, in admixture, a polyvinyl acetal resin, a butadiene rubber selected from the group consisting of rubbery polybutadiene and rubbery copolymers of butadiene and a copolymerizable monoolefinic material, and said copolymers containing at least 25% of combined butadiene, and a phenol-aldehyde resin in relative proportions of from 95 to 70% of said polyvinyl acetal resin and correspondingly from 5 to 30% of said rubber, said percentages being by weight based on the sum of said polyvinyl acetal resin and said rubber, and from 3 to 200% of said phenol-aldehyde resin based on the sum of said polyvinyl acetal resin and said rubber.

2. A composition of matter adapted to be used as an adhesive, binder, coating and the like, the binding components of said composition consisting essentially of, in admixture, a polyvinyl acetal resin, a butadiene rubber selected from the group consisting of rubbery polybutadiene and rubbery copolymers of butadiene and a copolymerizable monoolefinic material, said copolymers containing at least 25% of combined butadiene, and a thermosetting phenol-aldehyde resin in relative proportions of from 95 to 70% of said polyvinyl acetal resin and correspondingly from 5 to 30% of said rubber, said percentages being by weight based on the sum of said polyvinyl acetal resin and said rubber, and from 3 to 200% of said phenol-aldehyde resin based on the sum of said polyvinyl acetal resin and said rubber.

3. A composition of matter adapted to be used as an adhesive, binder, coating and the like, the binding components of said composition consisting essentially of, in admixture, a polyvinyl acetal resin, a butadiene-methyl acrylate rubbery copolymer, and a phenol-aldehyde resin in relative proportions of from 95 to 70% of said polyvinyl acetal resin and correspondingly from 5 to 30% of said rubbery copolymer, said percentages being by weight based on the sum of said polyvinyl acetal resin and said copolymer, and from 3 to 200% of said phenol-aldehyde resin based on the sum of said polyvinyl acetal resin and said rubbery copolymer.

4. A composition of matter adapted to be used as an adhesive, binder, coating and the like, the binding components of said composition consisting essentially of, in admixture, a polyvinyl acetal resin, a butadiene-methyl methacrylate rubbery copolymer, and a phenol-aldehyde resin in relative proportions of from 95 to 70% of said polyvinyl acetal resin and correspondingly from 5 to 30% of said rubbery copolymer, said percentages being by weight based on the sum of said polyvinyl acetal resin and said copolymer, and from 3 to 200% of said phenol-aldehyde resin based on the sum of said polyvinyl acetal resin and said rubbery copolymer.

5. A composition of matter adapted to be used as an adhesive, binder, coating and the like, the binding components of said composition consisting essentially of, in admixture, a polyvinyl acetal resin, a butadiene-acrylonitrile rubbery copolymer, and a phenol-aldehyde resin, said ingredients being present in relative proportions of from 95 to 70% of said polyvinyl acetal resin and correspondingly from 5 to 30% of said rubbery copolymer, said percentages being by weight based on the sum of said polyvinyl acetal resin and said rubbery copolymer, and from 3 to 200% of said phenol-aldehyde resin based on the sum of said polyvinyl acetal resin and said rubbery copolymer.

6. A composition of matter adapted to be used as an adhesive, binder, coating and the like, the binding components of said composition consisting essentially of, in admixture, a polyvinyl acetal resin, a butadiene-acrylonitrile rubbery copolymer, and a thermosetting phenol-aldehyde resin in relative proportions of from 95 to 70% of said polyvinyl acetal resin and correspondingly from 5 to 30% of said rubbery copolymer, said percentages being by weight based on the sum of said polyvinyl acetal resin and said copolymer, and from 3 to 200% of said phenol-aldehyde resin based on the sum of said polyvinyl acetal resin and said rubbery copolymer.

7. A composition of matter adapted to be used as an adhesive, binder, coating and the like, the binding components of said composition consisting essentially of, in admixture, a polyvinyl acetal resin, a butadiene-methyl acrylate rubbery copolymer, and a thermosetting phenol-aldehyde resin in relative proportions of from 95 to 70% of said polyvinyl acetal resin and correspondingly from 5 to 30% of said rubbery copolymer, said percentages being by weight based on the sum of said polyvinyl acetal resin and said copolymer, and from 3 to 200% of said phenol-aldehyde resin based on the sum of said polyvinyl acetal resin and said rubbery copolymer.

8. A composition of matter adapted to be used as an adhesive, binder, coating and the like, the binding components of said composition consisting essentially of, in admixture, a polyvinyl acetal resin, a butadiene-methyl methacrylate rubbery copolymer, and a thermosetting phenol-aldehyde resin in relative proportions of from 95 to 70% of said polyvinyl acetal resin and correspondingly from 5 to 30% of said rubbery copolymer, said percentages being by weight based on the sum of said polyvinyl acetal resin and said copolymer, and from 3 to 200% of said phenol-aldehyde resin based on the sum of said polyvinyl acetal resin and said rubbery copolymer.

9. A composition of matter adapted to be used as an adhesive, binder, coating and the like, the binding components of said composition consisting essentially of, in admixture, a polyvinyl formal resin, a butadiene-acrylonitrile rubbery copolymer, and a thermosetting phenol-aldehyde resin in relative proportions of from 95 to 85% of said polyvinyl formal resin and correspondingly from 5 to 15% of said rubbery copolymer, said percentages being by weight based on the sum of said polyvinyl formal resin and said rubbery copolymer, and from 10 to 100% of said phenol-aldehyde resin based on the sum of said polyvinyl formal resin and said rubbery copolymer.

References Cited in the file of this patent

UNITED STATES PATENTS

| Number | Name | Date |
|---|---|---|
| 2,376,854 | Saunders | May 22, 1945 |

FOREIGN PATENTS

| Number | Country | Date |
|---|---|---|
| 616,336 | Great Britain | Jan. 20, 1949 |